United States Patent [19]

McGlynn

[11] 4,095,467
[45] Jun. 20, 1978

[54] DISPOSABLE TAPE CORD THERMOMETER

[75] Inventor: John F. McGlynn, White Plains, N.Y.

[73] Assignee: IPCO Hospital Supply Corporation, White Plains, N.Y.

[21] Appl. No.: 594,218

[22] Filed: Jul. 9, 1975

[51] Int. Cl.² ............................................. G01K 7/00
[52] U.S. Cl. ............................................... 73/362 AR
[58] Field of Search .............. 73/362 AR; 338/25, 26, 338/28, 30; 242/55; 83/56, 66, 72, 73, 89, 371; 174/117 FF

[56] References Cited

U.S. PATENT DOCUMENTS

| 1,841,732 | 1/1932 | Hausman | 225/89 X |
|---|---|---|---|
| 1,983,520 | 12/1934 | Charch et al. | 174/117 FF UX |
| 3,240,867 | 3/1966 | Maddox | 174/69 |
| 3,377,862 | 4/1968 | Gheorghiu | 73/362 AR |
| 3,495,782 | 2/1970 | Nelson et al. | 83/371 X |
| 3,524,602 | 8/1970 | Greene | 242/55.19 A |
| 3,537,053 | 10/1970 | Snoberger et al. | 338/25 |
| 3,630,170 | 12/1971 | Christo | 242/197 UX |
| 3,752,113 | 8/1973 | Blechman | 116/114 R |
| 3,773,272 | 11/1973 | Wallace | 242/55.19 A |
| 3,776,040 | 12/1973 | Gould | 73/362 AR |
| 3,857,285 | 12/1974 | Athey et al. | 73/362 AR |
| 3,916,877 | 11/1975 | Beckman | 73/361 X |
| 3,935,744 | 2/1976 | Beckman | 73/361 |
| 3,949,609 | 4/1976 | Hammerslag | 73/362 AR |

Primary Examiner—Anthony V. Ciarlante
Attorney, Agent, or Firm—Holland, Armstrong, Wilkie & Previto

[57] ABSTRACT

A tape cord thermometer in which a disposable tape acts as the conducting means between a thermometer probe and a reading device.

24 Claims, 16 Drawing Figures

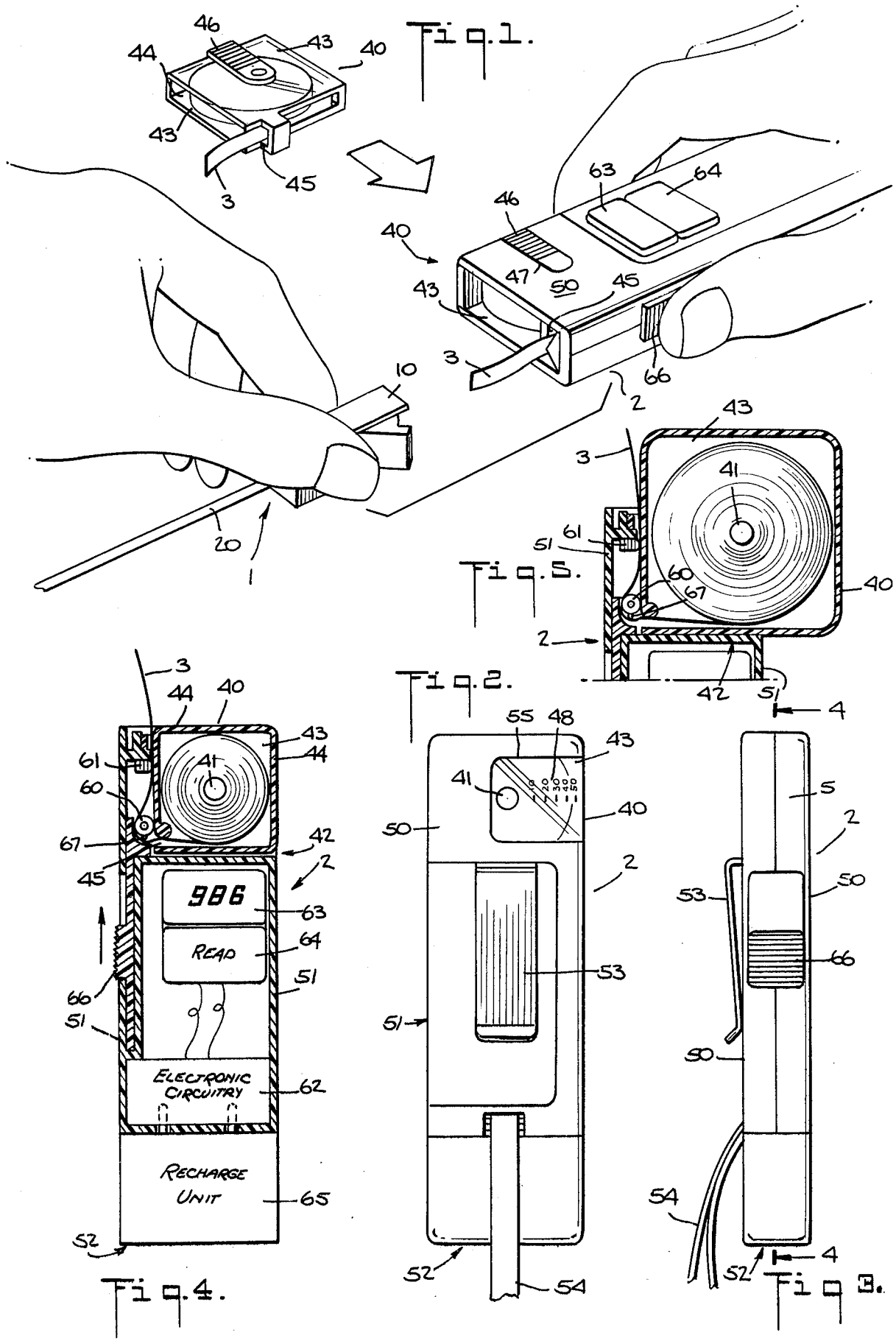

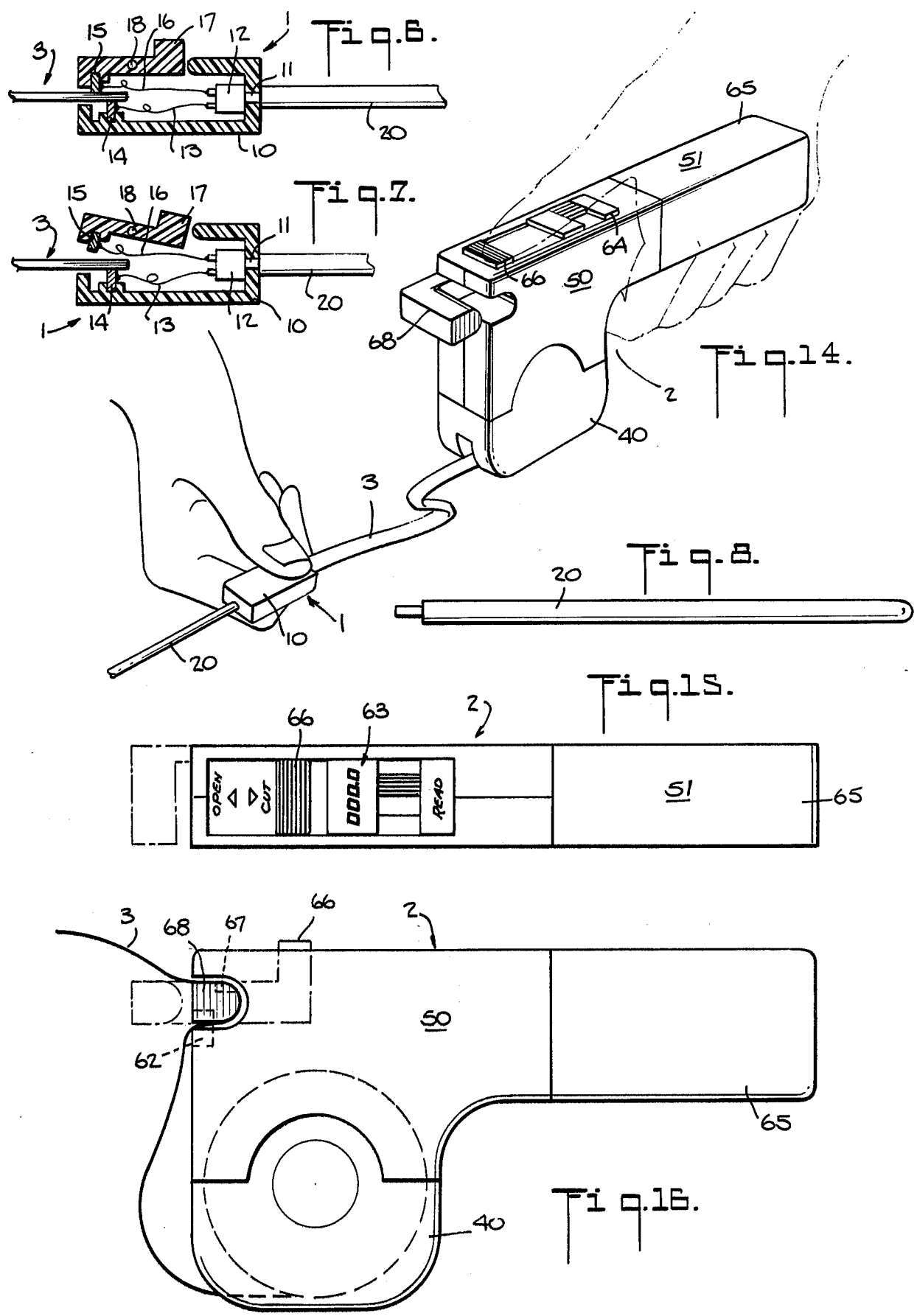

DISPOSABLE TAPE CORD THERMOMETER

DESCRIPTION

The present invention relates to a thermometer and more particularly to a thermometer which has the probe mounted at one end of a disposable tape and a reading device mounted at the other end of the disposable tape.

For ease in description, the invention will be described with particular reference to a thermometer and specifically in connection with a clinical thermometer adapted to sense human or animal temperatures. However, it will be understood that the invention may be used to sense conditions other than temperatures such as pressure, radiation, light, etc.

The invention herein comprises a probe which detects the temperature, a reading device to read the temperature detected and a disposable tape to which the probe and the reading device is connected for transmitting the temperature data from the probe to the reader unit.

The present invention is particularly adapted to minimize contamination of hospital temperature sensing mechanisms especially. The invention comprises a system where a patient's temperature is taken electronically by a mechanism which includes a probe assembly, a tape assembly and a reader assembly. Since the probe and the tape come into intimate contact with the patient when the patient's temperature is taken, it is desirable to minimize contamination of these parts as the hospital attendant moves from one patient to aother, taking each's temperature. Hence, according to the invention, the tape is severable and disposable and the probe unit is also capable of being disposed of or changed and/or sterilized after each use.

One of the objects of the present invention is the provision of an improved sensing device in which the disposable tape acts as the conductor of the impulses.

Another object of the present invention is the provision of improved means whereby the tape may be easily severed after use and replaced with new tape.

Another object of the present invention is the provision of an improved conducting tape.

Another object of the present invention is the provision of an improved reading unit for reading impulses detected by a probe.

Another object of the present invention is the provision of an improved thermometer in which the probe is easily replaceable.

Another object of the present invention is the provision of an improved thermometer in which the tape is in a cartridge which is removably mounted in the reading unit.

Another object of the present invention is the provision of an improved tape in which the probe is built into the tape and is discarded with the tape.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is an exploded perspective view showing the present invention;

FIG. 2 is a side view of the reader unit of the present invention;

FIG. 3 is an end view of the reader unit;

FIG. 4 is a sectional view taken along line 4—4 of FIG. 3;

FIG. 5 is a fragmentary detailed sectional view of a different embodiment of the invention embodying a magazine of a different size;

FIG. 6 is a sectional view of the probe unit in its operative position;

FIG. 7 is a similar sectional view showing the probe unit in its inoperative position;

FIG. 8 is an elevational view showing the removable probe of the present invention;

FIG. 14 is a perspective view of another embodiment of the invention;

FIG. 15 is a top view thereof; and

FIG. 16 is a side elevational view thereof.

Figure 11:
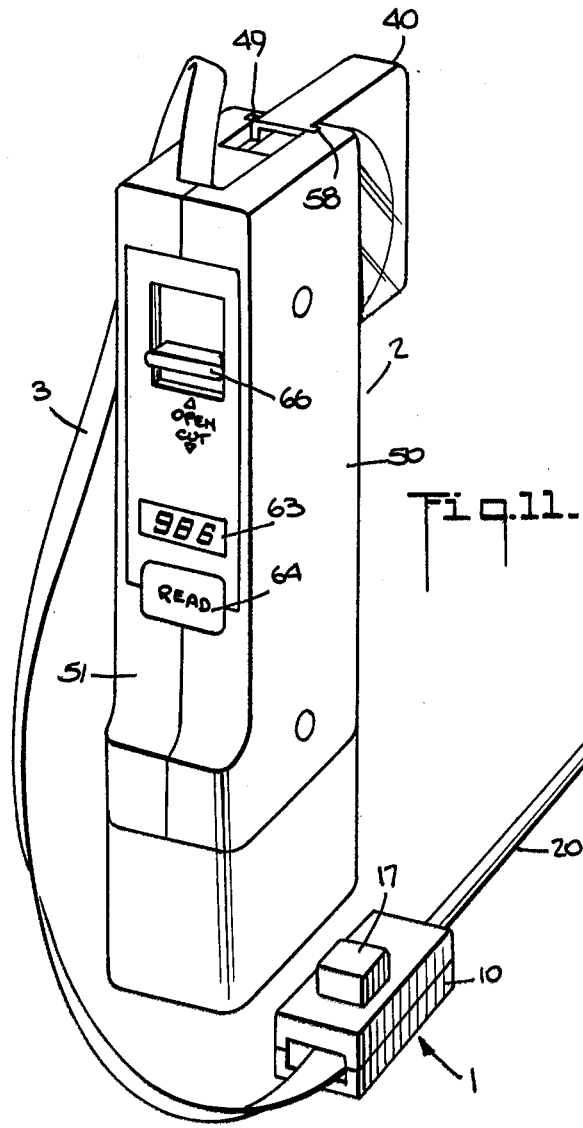
FIG. 11 is a perspective view of another embodiment of the present invention.

Referring to FIGS. 1 to 5 of the drawings, the present invention embodies a probe unit 1 and a reader unit 2 connected together by flexible conducting tape 3.

The probe unit 1 comprises an outer casing 10 having a probe-receiving opening 11 in its front wall into which a probe 20 may be removably mounted. The probe 20 is inserted into a socket unit 12 which may be connected by a lead wire 13 to a stationary contact 14 and to a movable contact 15 by another lead wire 16. The movable contact 15 is mounted on a snap button or clip 17 which moves relative to the casing 10 around the pivot 18.

The probe 20 is preferably an elongated unit as shown in FIG. 8 which is preferably a resistance thermistor and which is threadedly or otherwise mounted within the socket unit 12 in the casing 10 through opening 11. After use (especially if used as a clinical thermometer) the probe 20 can either be removed and sterilized or removed and discarded, as the case may be. It will, of course, be understood that if desired, the probe 20 need not be made removable, in which event the probe 20 with the casing 10 would have to be sterilized after use, if used as a clinical thermometer.

Figure 9:
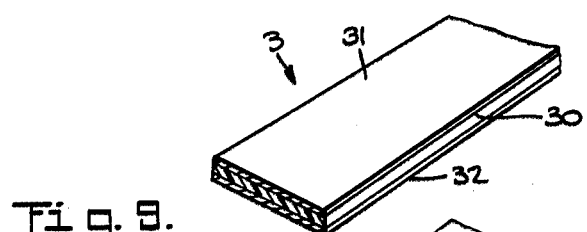
FIG. 9 is a cross-sectional perspective view of the tape used with the present invention.

The tape 3 which may be used with the present invention is shown in FIG. 9 and is a flexible conducting tape comprising a layer of plastic insulating material 30, such as mylar, interposed between layers 31 and 32 of a conducting material, such as metallic foil. It will be understood that insulating and conducting layers of other materials may also be used, if desired.

When one end of the tape 3 is inserted into the casing 10 of the probe unit 1, one metallic layer 31 will come into contact with the stationary contact 14 and the other layer will be placed into contact with the movable contact 15 when the snap button 17 is closed. Hence, when the tape 3 is in place, an electrical path is closed from the probe 20 through the tape 3 to the reader unit 2.

The tape 3 is preferably mounted within a cartridge 40 on a spindle 41. The cartridge 40 is mounted within the reader unit 2 and comprises a pair of side walls 43 and a plurality of end walls 44 one of which has an opening 45 therein through which the tape 3 may be unwound. One side wall 43 is preferably provided with a push button 46 slidable in slot 47 for ease in permitting the cartridge 40 to be removably mounted within the reader unit 3. The other side wall 43 of cartridge 40 may preferably have indicia 48 therein to indicate the amount of tape 3 left in the cartridge 40.

The reader unit 2 comprises a pair of side walls 50, a pair of end walls 51, and a bottom wall 52. The usual pocket clip 53 and wrist strap 54 may also be provided. The top of the reader unit 2 has a socket 42 to receive the cartridge 40 and has slots 47 and 55 on the opposed side walls 50 to accommodate the push button 46 of the cartridge 40 and to permit the indicia 48 of the cartridge 40 to show therethrough. When the tape cartridge 40 is to be removed, the push button 46 and the other side 43 of the cartridge is grasped through the two slits 47 and 55 so that the cartridge 40 can be easily removed and replaced with a new cartridge 40.

The reader unit 2 comprises a pair of contacts, such as 60 and 61, with which opposed conducting layers 31 and 32 makes contact and which are electrically connected to an electronic unit 62. Preferably, a display unit 63 is connected to the electronic unit 62 which is activated by a depressable read button 64. When the temperature is to be read, the button 64 is depressed and the temperature is displayed on display 63. Alternately, the temperature can be recorded on a permanent recording. A recharge unit 65, such as a battery, may be used to provide power to the unit.

When a particular temperature has been taken, the tape 3 is cut by a cutter 67 adjacent contact 60 which is brought into contact with tape 3 by moving a cut button 66 upwardly to move tape 3 up against cutter 67 as shown in FIG. 3.

FIG. 5 shows a reader unit 2 in which the cartridge 40 is larger than the cartridge 40 shown in FIGS. 1 to 4 so that it extends slightly beyond the socket 42 in the reader unit 2, preferably, the same reader unit 2 will accommodate both large and small cartridges as may be desired.

Figure 10:
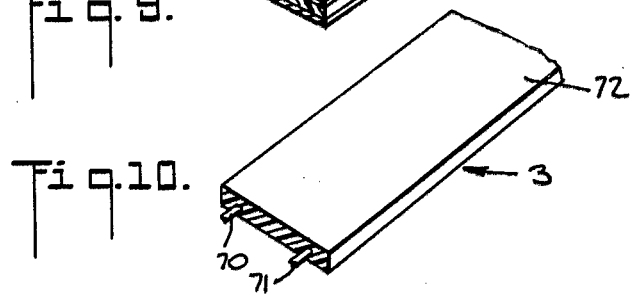
FIG. 10 is a cross-sectional perspective view of another embodiment of a tape which may be used with the present invention.

FIG. 10 shows a modified tape 3 which may be used with the present invention. The conducting wires or units 70 and 71 are imbedded within a ribbon of insulating material 72 is spaced relationship to each other. The tape in this particular embodiment is as flexible as the tape shown in FIG. 9 and may be used in substantially the same manner as the tape shown in FIGS. 1 to 9.

With this construction, the tape cartridge 40 is mounted in the reader unit 21 and the tape 3 is unwound. The tape 3 is clipped to the contacts 14-15 within the probe unit 1 and the casing 10 has a fresh probe 20 mounted thereon. When the probe 20 is inserted in a patient or animal, the temperature units are sensed by the probe 20 and conducted to the electric circuits in reader unit 2 through the tape 3.

A reader button 64 may be activated to display the temperature through the display unit 63. When this operation is completed, the tape 3 may be severed and discarded and a fresh length of tape 3 is unwound from the cartridge 40 and placed in the probe unit 1 so that the temperature of another patient can be taken. The probe 20 itself will be removed and replaced with a fresh probe with the used probe either discarded or sterilized. Hence, whenever the temperature is taken of each patient, the temperature sensing units wll be free of any contamination.

Figure 12:
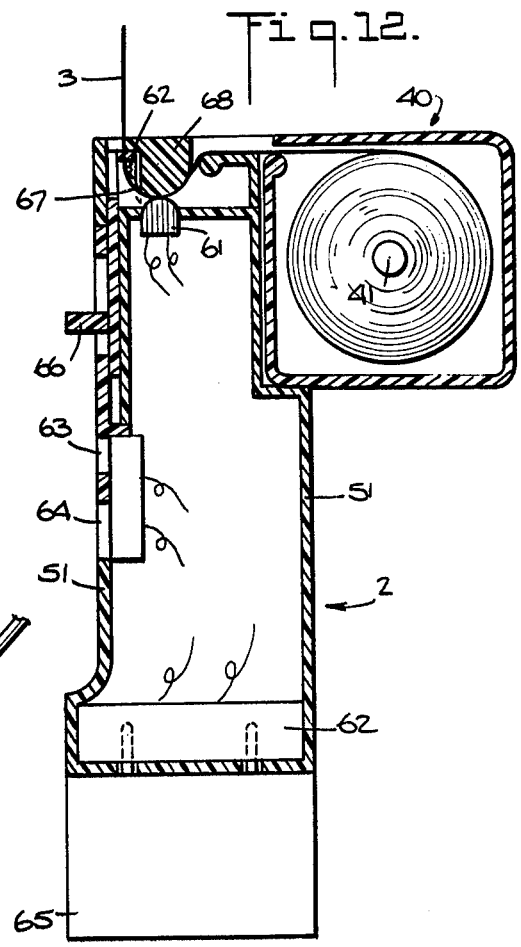
FIG. 12 is a sectional view of the embodiment shown in FIG. 11 showing the parts in their operative positions.
Figure 13:
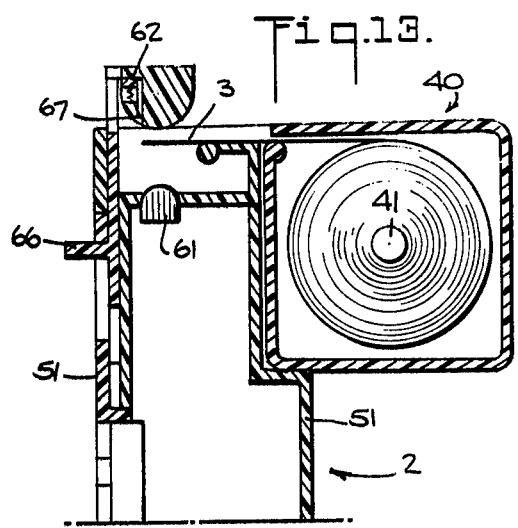
FIG. 13 is a fragmentary sectional view similar to FIG. 12 showing the parts in their inoperative positions.

FIGS. 11 to 13 show a different embodiment of the present invention. In this embodiment, the cartridge 40 is slightly different in that it has a key 49 adapted to enter a slot 58 in the top of a reader unit 2. The reader unit 2 has movable and stationary contacts 60 and 61, respectively, between which the tape 3 is clamped and a knife 67 is provided and operated by button 66 for severing the tape 3. A clamp head 68 is operatively connected to the button 66 so that movement of button 66 moves the clamp head 68 to clamp or release a tape or can move the knife 67 to cut the tape. In all other respects, the structure and operation of this embodiment is similar to the structure and operation of the embodiment described in FIGS. 1 to 9.

FIGS. 14 to 16 show still another embodiment of the present invention. The reader unit 2 is in the form of a pistol grip which has a tape cartridge 40 adapted to be removably snapped thereon. The reader unit 2 has the movable and stationary contacts 60 and 61 and a clamp head 68 connected to button 66. There is also a knife 67 on clamp head 68 to sever the tape where desired. The operation of this embodiment is similar to that of the two other embodiments, described above.

It will thus be seen that the present invention provides a sensing device in which a disposable tape acts as a conductor and may be easily severed and replaced with a new tape and adapted to be used with a reading unit for reading the impulses being detected by the probe and being transmitted to it by the tape and in which the probe is easily replaceable with the tape wound on a cartridge which is removably mounted in the reading unit.

As many and varied modifications of the subject matter of this invention will become apparent to those skilled in the art from the detailed description given hereinabove, it will be understood that the present invention is limited only as provided in the claims appended hereto.

I claim:

1. An electronic sensing assembly comprising: a probe unit adapted for connection and disconnection with one end of a disposable and severable electrically conductive tape; a cartridge for housing a supply of said tape; a reader unit comprising: means for housing said cartridge; means for electrically contacting a portion of said tape proximate the cartridge with powered electronic circuitry and indicating means; means for severing said tape at said cartridge and means permitting withdrawal of additional lengths of tape, whereby a fresh length of tape can be withdrawn for each use with a connectible probe after severing the former length which was subject to a prior use.

2. A sensing assembly as claimed in claim 1 wherein said tape comprises a pair of conducting elements disposed lengthwise thereto and an insulating element electrically insulating the two conducting elements.

3. A sensing assembly as claimed in claim 1 wherein said tape comprises a pair of conducting elements and wherein said conducting elements comprises a pair of laminated layers supported by an insulating layer.

4. A sensing assembly as claimed in claim 1 wherein said tape comprises a pair of conducting elements and wherein said conducting elements comprises a pair of conducting units imbedded within an insulating layer.

5. A sensing assembly as claimed in claim 1 wherein said probe unit comprises a probe, a casing, and electrical contact units in contacting relationship to the probe.

6. A sensing assembly as claimed in claim 5 wherein said probe is removably mounted within said probe unit.

7. A sensing assembly as claimed in claim 6 wherein said probe unit has at least one movable contact.

8. A sensing assembly as claimed in claim 7 wherein said movable contact is on a pivoted clip member.

9. A sensing assembly as claimed in claim 1 wherein a socket is provided in the reading unit to receive the cartridge.

10. A sensing assembly as claimed in claim 9 wherein said socket has a key-shaped slot to receive a cartridge with a key-shaped element.

11. A sensing assembly as claimed in claim 10 wherein said reader unit has a slot along one wall to receive a button.

12. A sensing assembly as claimed in claim 11 wherein said reader unit has an opening on another wall to permit indicia to show therethrough.

13. A sensing assembly as claimed in claim 12 wherein said reader unit has a pair of electrical contacts adapted to contact the tape.

14. A sensing assembly as claimed in claim 13 wherein a movable cutter is provided to sever the tape.

15. A sensing assembly as claimed in claim 14 wherein a display is provided thereon.

16. A sensing assembly as claimed in claim 15 wherein the display is activated by a read button.

17. A sensing assembly as claimed in claim 16 wherein a recharge unit is mounted on the cartridge.

18. A sensing assembly as claimed in claim 17 wherein one of the contacts is mounted on a movable clamp in operative relationship to the sever button.

19. A sensing assembly as claimed in claim 18 wherein said cutter is in operative relationship to the reader button.

20. A sensing assembly as claimed in claim 19 wherein a clamp is provided to clamp the tape into electrical contact.

21. A sensing assembly as claimed in claim 1 wherein said tape cartridge comprises a pair of side walls and a plurality of end walls, an opening in the end wall, means for accommodating a tape therewithin, and means to permit the cartridge to be held in place in a reader unit.

22. A sensing assembly as claimed in claim 21 wherein said means comprises a push button.

23. A sensing assembly as claimed in claim 22 wherein said means comprises a key and slot construction.

24. A sensing assembly as claimed in claim 1 wherein indicia is provided on a side wall to indicate the amount of tape remaining in the cartridge.

* * * * *